Aug. 17, 1948.  L. W. WIGHTMAN  2,447,383
ROTATABLE ELECTRICAL DEVICE
Filed Dec. 14, 1945

Inventor:
Lawrance W. Wightman,
by Prowell S. Mack
His Attorney.

Patented Aug. 17, 1948

2,447,383

UNITED STATES PATENT OFFICE 2,447,383

ROTATABLE ELECTRICAL DEVICE

Lawrance W. Wightman, Fort Wayne, Ind., assignor to General Electric Company, a corporation of New York Application December 14, 1945, Serial No. 635,003

2 Claims. (Cl. 172—120)

My invention relates to rotatable electrical devices, such as rotatable members of dynamoelectric machines.

An object of my invention is to provide an improved rotatable electrical device by providing an improved and simplified arrangement for balancing the rotatable member.

Another object of my invention is to provide an improved dynamoelectric machine rotatable member.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
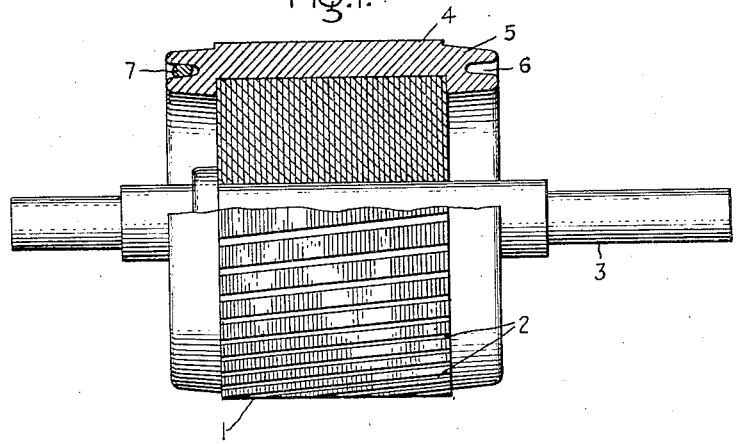
Figure 2:
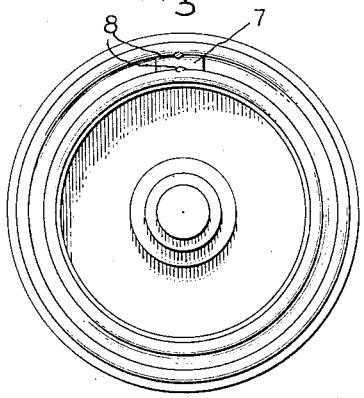

In the drawing, Fig. 1 is a side elevational view, partly in section, illustrating one embodiment of my improved rotatable member; and Fig. 2 is an end view of the rotatable member shown in Fig. 1.

Referring to the drawing, I have shown a rotatable member of a dynamoelectric machine provided with a laminated core 1 of magnetic material having longitudinally extending winding slots 2 formed in the outer periphery thereof. This rotatable member core is mounted on a supporting shaft 3 and is provided with a winding including conductors 4 which may be suitably cast in the winding slots 2 and which are electrically short circuited at both ends thereof by a circumferentially extending ring 5 of electrically conductive material at each end of the core which may be cast integral with the slot conductors 4. Both of these end rings preferably are formed of two relatively thin radially inner and outer circumferentially extending portions which when made as castings will provide relatively dense cast material of uniform electrical characteristics and extend as a double flanged portion with a circumferential groove 6 therebetween at each end of the rotatable member. Such rotatable members of dynamoelectric machines, or other electrical devices, generally require an accurately balanced construction, and the balancing of such members usually is provided by the addition of a weight to a certain part of the member or by the removal of material from a given part of the rotatable member to provide the desired balance. In my construction, an improved and simplified arrangement is provided for securing such a balancing weight to the rotatable member, and the proper location for a balancing weight may be determined in any conventional manner, while the size of the balancing weight may be adjusted to provide the desired balancing force. A balancing weight 7 formed of a suitable piece of wire cut to the proper length to provide the desired weight may be arranged in the groove 6 formed in the end ring 5 and located as desired to provide the required balance to the rotatable member. This balancing weight 7 then is secured in position by staking a portion 8 on the two sides of the ring 5 on both sides of the balancing weight so as to secure the weight in position permanently for balancing the rotatable member. The proper number, size, and location of the weights should be varied in accordance with the requirements of each rotatable member, and the weights may be located in both of the end rings 5 or in only one of the end rings as determined by the balancing procedure.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine rotatable member having a core with longitudinally extending winding slots therein, a winding including conductors cast in said winding slots and a circumferentially extending ring of electrically conductive material at each end of said core cast integral with said slot conductors in the form of relatively thin circumferentially extending double flanged portions of dense cast material with an open continuous circumferential groove between said flanged portions, said groove being wider at the face of said ring than at its base, and means including a balancing weight secured in at least one of said grooves for balancing said rotatable member.

2. A dynamoelectric machine rotatable member having a laminated core of magnetic material with longitudinally extending winding slots therein, a winding including conductors cast in said winding slots and a circumferentially extending ring of electrically conductive material at each end of said core cast integral with said slot conductors in the form of two relatively thin radially inner and outer circumferentially extending portions of dense cast material and uniform electrical characteristics formed with an open continuous circumferential groove therebetween, said groove having its widest portion at the face of said ring, and means including a balancing weight secured in one of said grooves by a staked portion on the two sides of the ring on two sides of said balancing weight for balancing said rotatable member.

LAWRANCE W. WIGHTMAN.

REFERENCES CITED

The following references are of record in the file of this patent:

UNITED STATES PATENTS

| Number | Name | Date |
|---|---|---|
| 920,898 | Abtmeyer | May 11, 1909 |
| 1,034,069 | Brown | July 30, 1912 |
| 1,316,004 | Trent | Sept. 16, 1919 |

FOREIGN PATENTS

| Number | Country | Date |
|---|---|---|
| 150,720 | Switzerland | Nov. 15, 1930 |